(12) United States Patent
Aarts

(10) Patent No.: US 6,469,819 B2
(45) Date of Patent: Oct. 22, 2002

(54) OPTICAL SCANNING DEVICE COMPRISING AN ACTUATOR FOR A DISPLACEABLE COLLIMATOR LENS

(75) Inventor: Jan Willem Aarts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 44 days.

(21) Appl. No.: 09/790,345

(22) Filed: Feb. 21, 2001

(65) Prior Publication Data

US 2001/0028493 A1 Oct. 11, 2001

(30) Foreign Application Priority Data

Feb. 24, 2000 (EP) .............................................. 00200639

(51) Int. Cl.[7] .............................................. G02B 26/08
(52) U.S. Cl. .............. 359/210; 369/112.01; 369/112.23
(58) Field of Search .................................. 359/209–210, 359/819, 822–824; 369/44.11, 44.12, 112.01, 112.23

(56) References Cited

U.S. PATENT DOCUMENTS

| 4,553,227 A | 11/1985 | Kido et al. ..................... 369/44 |
| 4,959,824 A | 9/1990 | Ueda et al. ............... 369/44.14 |
| 5,001,694 A | 3/1991 | Lee et al. ................. 369/44.16 |
| 5,754,513 A | 5/1998 | Yagi et al. ................... 369/112 |

Primary Examiner—James Phan

(74) Attorney, Agent, or Firm—Michael E. Belk

(57) ABSTRACT

The invention relates to an optical player and an optical scanning device (15) used therein for scanning an optical information carrier (9). The scanning device comprises a radiation source (25), a collimator lens unit (35) having a first optical axis (37), an objective lens unit (39) having a second optical axis (41), and an actuator (59) by means of which the collimator lens unit can be displaced in a direction parallel to the first optical axis from a first position (A) to a second position (B), and conversely. Since the collimator lens unit is displaceable, the scanning device can suitably be used to scan information carriers comprising more than one information layer (13) or to scan information carriers having mutually different substrate (11) thicknesses. The actuator (59) comprises a first part (61) having a permanent magnet (71) and a first magnetizable part (73) of a magnetic circuit (75), and a second part (63), which is displaceable with respect to the first part and includes an electric coil (77) and a second magnetizable part (79) of the magnetic circuit (75). Around each of said two positions, and in a non-energized condition of the coil, the first part exerts a magnetic force ($F_M$) on the second part, which magnetic force drives the second part into the respective one of said two positions, so that the magnetic force provides stable equilibriums in both said positions. In a special embodiment, the first magnetizable part is U-shaped, the permanent magnet being arranged between the two legs (81, 83) of the first magnetizable part and having a magnetization direction (M) which extends parallel to the two legs (81, 83). In a preferred embodiment, the second part is guided with respect to the first part by means of a pair of leaf springs (67, 69) extending in a plane transverse to the optical axis of the collimator lens unit.

6 Claims, 4 Drawing Sheets

Figure 1:
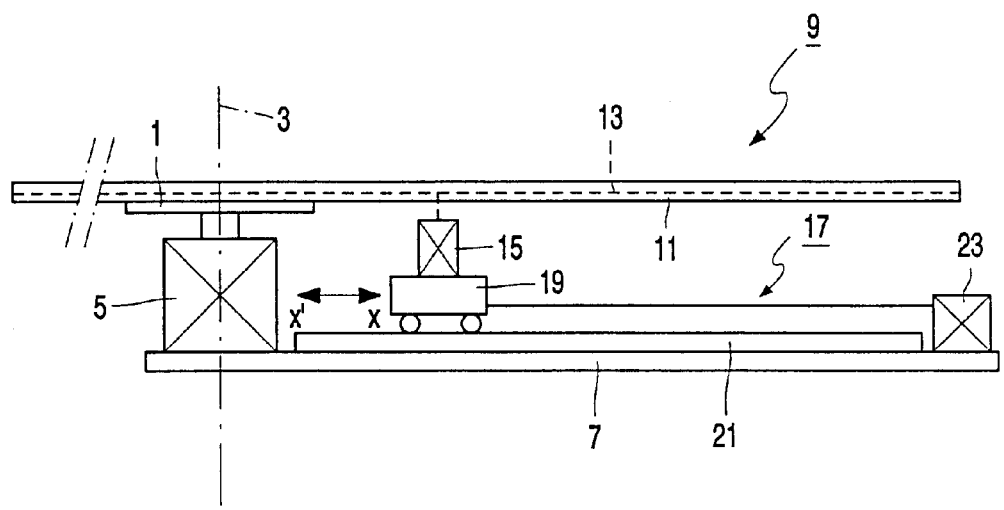

OPTICAL SCANNING DEVICE COMPRISING AN ACTUATOR FOR A DISPLACEABLE COLLIMATOR LENS

The invention relates to an optical scanning device for scanning an optically scannable information carrier, which scanning device is provided with a radiation source, a collimator lens unit with a first optical axis, an objective lens unit with a second optical axis, and an actuator for displacing the collimator lens unit, in a direction parallel to the first optical axis, from a first position to at least a second position, which actuator is provided with a first part and a second part, which are displaceably guided with respect to each other in a direction parallel to the first optical axis.

The invention also relates to an optical player comprising a table which can be rotated about an axis of rotation, an optical scanning device for scanning an optically scannable information carrier which can be placed on the table, and a displacement device by means of which at least an objective lens unit of the scanning unit can be displaced, in operation, with respect to the axis of rotation mainly in a radial direction.

An optical player and an optical scanning device employed therein of the types mentioned in the opening paragraphs are known from U.S. Pat. No. 5,754,513. An information carrier which can be scanned by means of the known optical scanning device comprises a transparent substrate on which an information layer with information tracks is provided. The scanning device scans the information layer from the side of the information carrier where the transparent substrate is situated, in which scanning operation, a radiation beam supplied by the radiation source passes through the transparent substrate. The known optical scanning device can suitably be used to scan information carriers of two different substrate thicknesses. For this purpose, the collimator lens unit of the known scanning device can be positioned in two positions, viewed parallel to the first optical axis. A displacement of the collimator lens unit causes a radiation beam's convergence angle present between the objective lens unit and the substrate to be adapted to the substrate thickness such that the radiation beam is focused to a minimum scanning spot on the information layer of the information carrier. The actuator of the known scanning device, by means of which the collimator lens unit can be displaced, is not described in greater detail in U.S. Pat. No. 5,754,513.

It is an object of the invention to provide an optical scanning device and an optical player of the types mentioned in the opening paragraphs, which are provided with a functional, reliable and efficient actuator for displacing the collimator lens unit.

To achieve this object, an optical scanning device in accordance with the invention is characterized in that the first part of the actuator comprises a permanent magnet and a first magnetizable part of a magnetic circuit, while the second part of the actuator comprises an electric coil and a second magnetizable part of a magnetic circuit, both parts of the actuator mutually exerting a magnetic force in predetermined regions around the first position and around the second position, and in a non-energized state of the coil, which magnetic force causes both parts of the actuator to move with respect to each other into, respectively, the first and the second position.

To achieve this object, an optical player in accordance with the invention is characterized in that the optical scanning device used therein is an optical scanning device in accordance with the invention.

As said magnetic force in said regions causes the two parts of the actuator to be moved with respect to each other into, respectively, the first and the second position, the magnetic force provides stable mutual equilibrium positions of the two parts of the actuator in the first and the second position. As said equilibrium positions occur in a non-energized state of the coil, maintaining said equilibrium positions does not require electric current in the coil, i.e. no electric energy. A mutual displacement of the two parts of the actuator from the first position to the second position, or conversely, takes place by means of a comparatively short current through the coil. Interaction between said current and the magnetic field of the permanent magnet causes an electromagnetic driving force, under the influence of which both parts of the actuator are displaced with respect to each other, against said magnetic forces, from one equilibrium position to the other equilibrium position. In this manner, a functional, reliable and efficient operation of the actuator is obtained.

A particular embodiment of an optical scanning device in accordance with the invention is characterized in that the first magnetizable part of the magnetic circuit is U-shaped and provided with two legs which extend substantially perpendicularly to the first optical axis, and the permanent magnet is arranged between the two legs and magnetized in a direction which is substantially parallel to said legs, while the electric coil is secured to the second magnetizable part of the magnetic circuit and provided with wire portions extending substantially perpendicularly to the first optical axis and substantially perpendicularly to the legs. In this particular embodiment, the magnetic circuit includes a magnetic field with field lines which, in a transition region, make a U-turn from the end of both legs of the U-shaped part of the magnetic circuit, so as to be directed inwards, i.e. towards the permanent magnet. With respect to the U-shaped part, the second magnetizable part of the magnetic circuit is displaceably guided in said transition region in a direction parallel to the first optical axis, i.e. in a direction substantially perpendicular to the legs of the U-shaped part. At the location of each one of the two legs, a stable equilibrium position of the second magnetizable part with respect to the U-shaped part is obtained at the location where the concentration of the field lines in said transition region is highest. In this particular embodiment, the actuator is of a simple structure, and the equilibrium positions obtained are particularly stable.

A further embodiment of an optical scanning device in accordance with the invention is characterized in that the first part and the second part of the actuator are displaceably guided, with respect to each other, in a direction parallel to the first optical axis by means of two leaf springs extending transversely to the first optical axis. The leaf springs provide a particularly rigid mutual support of the two parts in directions perpendicular to the first optical axis, and they also provide the actuator with a particularly simple structure.

Yet another embodiment of an optical scanning device in accordance with the invention is characterized in that, in the first position and in the second position, the leaf springs exert an elastic pretension on both parts of the actuator, causing both parts of the actuator to move with respect to each other into, respectively, the second position and the first position. As the pretension causes both parts of the actuator in the first position and in the second position to move with respect to each other into, respectively, the second position and the first position, said pretension is helpful in mutually displacing the two parts from one equilibrium position to the other equilibrium position, so that the current through the coil necessary for such a displacement is limited.

A particular embodiment of an optical scanning device in accordance with the invention is characterized in that the scanning device is provided with a control unit, which is embodied so as to control an electric control current in the coil in such a way, that the two parts of the actuator proximate to the first position and proximate to the second position can be positioned, with respect to each other, in a position wherein a spherical aberration of a radiation beam supplied by the radiation source in a transparent substrate of the information carrier can be corrected in a predetermined way. In this particular embodiment, the actuator is not only used to adapt the optical scanning device to various substrate thicknesses of the information carriers by means of comparatively large displacements of the collimator lens unit, but also to correct spherical aberrations of the radiation beam in the transparent substrate of an information carrier by means of comparatively small displacements of the collimator lens unit around the first and the second position. In this embodiment, the actuator thus fulfills a dual function and hence is optimally used.

These and other aspects of the invention will be apparent from and elucidated with reference to the embodiment(s) described hereinafter.

Figure 2:
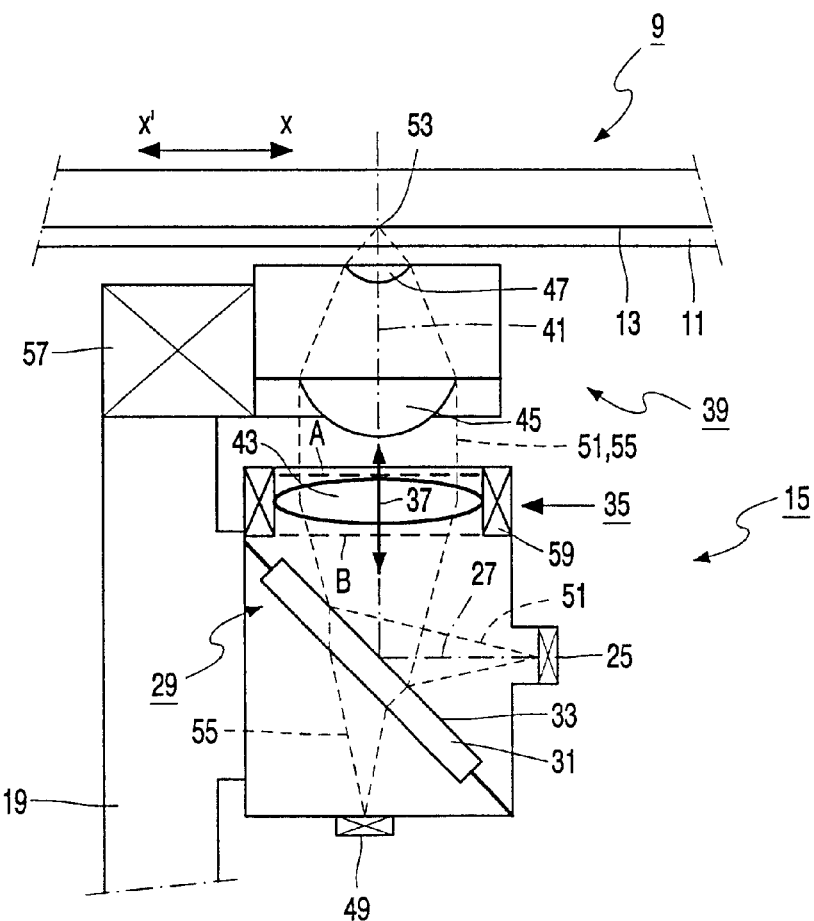
Figure 3:
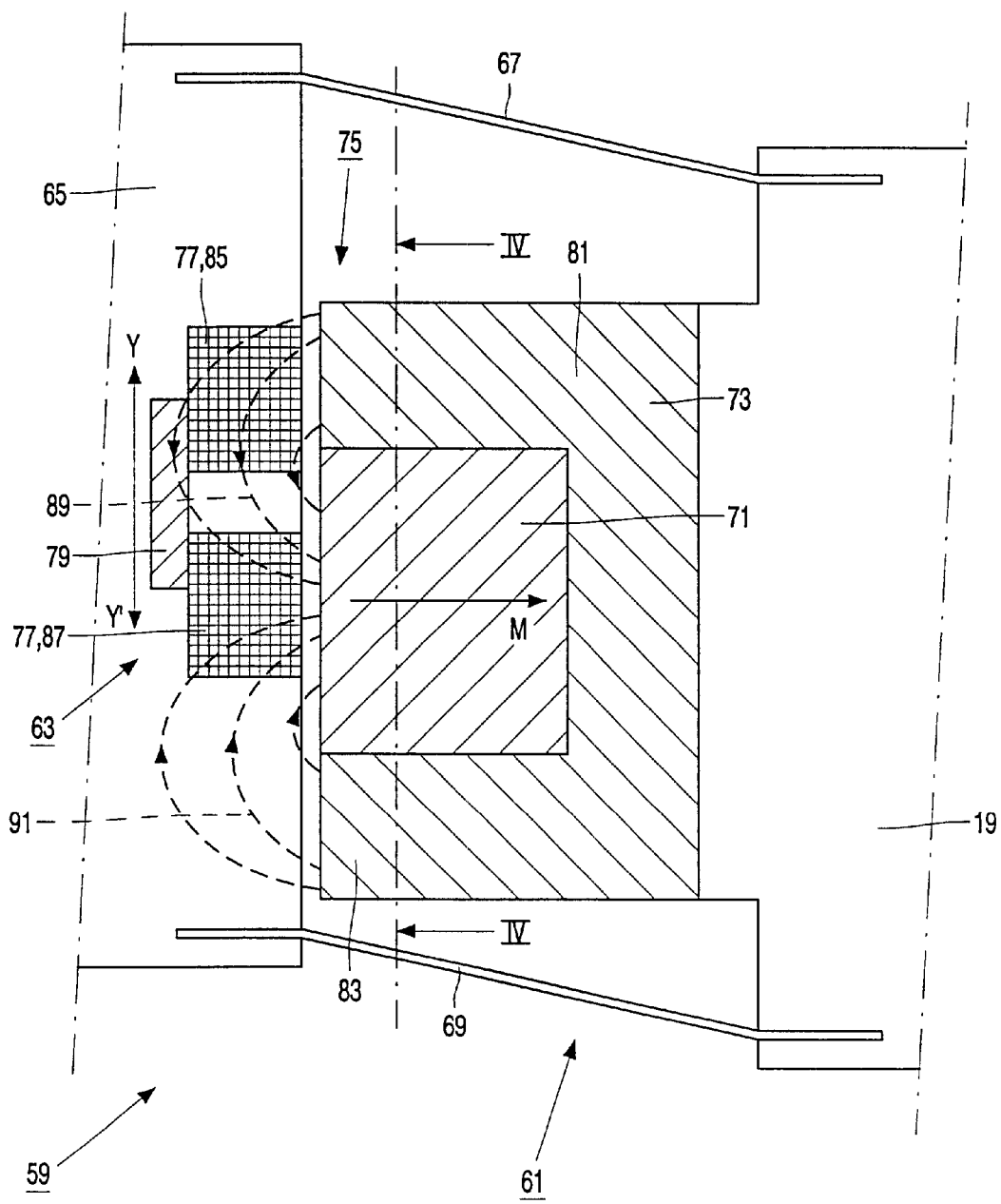
Figure 4:
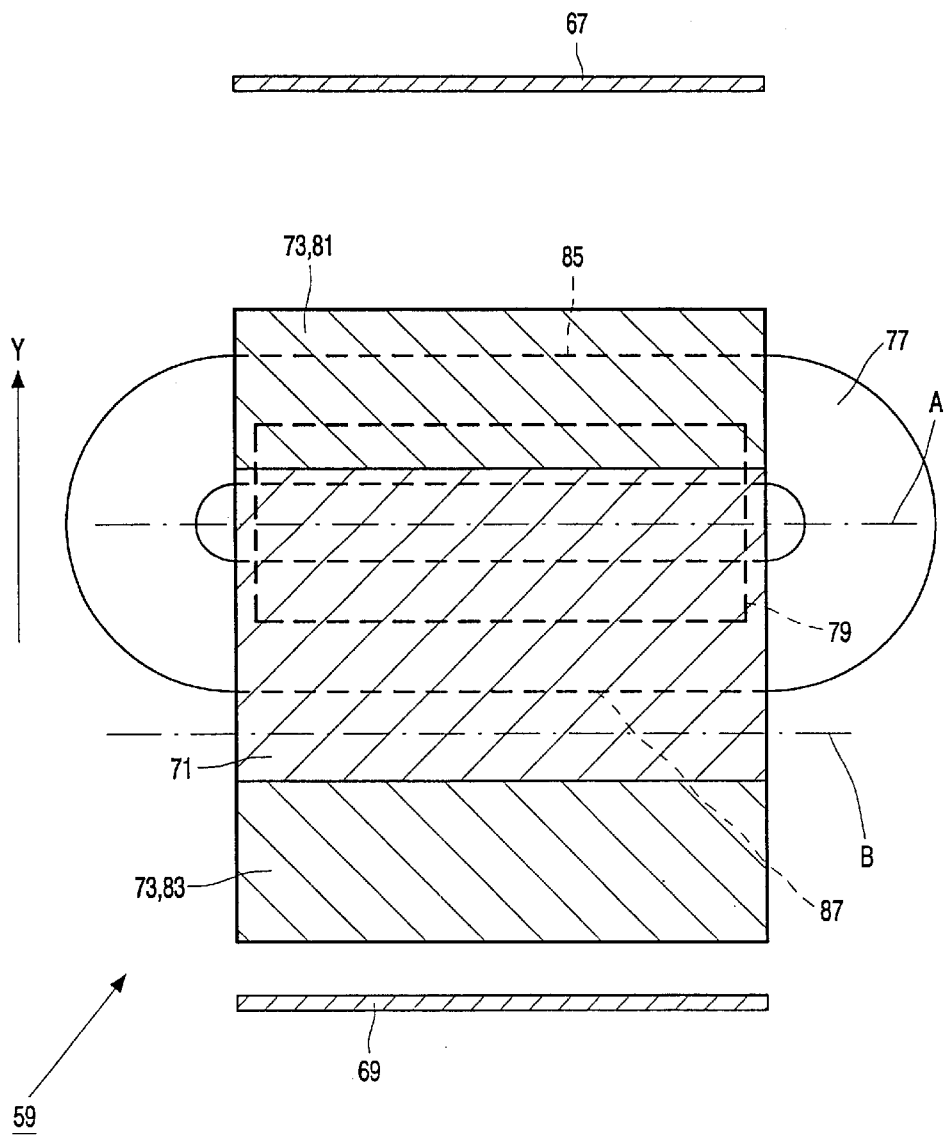
Figure 5:
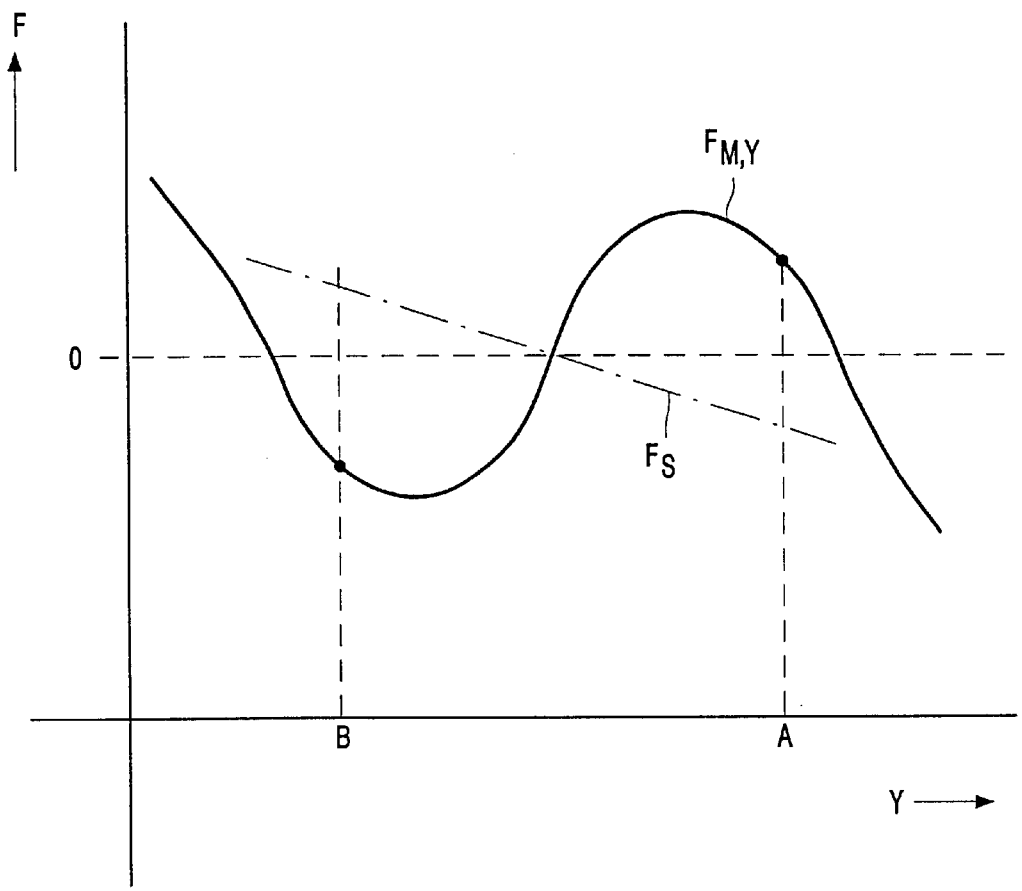

In the drawings:

FIG. 1 diagrammatically shows an optical player in accordance with the invention, FIG. 2 diagrammatically shows an optical scanning device in accordance with the invention, which is used in the optical player shown in FIG. 1, FIG. 3 is a sectional view of an actuator of the optical scanning device shown in FIG. 2, FIG. 4 is a sectional view taken on the line IV—IV in FIG. 3, and FIG. 5 shows a connection between a magnetic force supplied by the actuator shown in FIG. 3 and a position of the actuator.

FIG. 1 diagrammatically shows an optical player in accordance with the invention, which comprises a table 1, which can be rotated about an axis of rotation 3 and driven by an electric motor 5 which is secured onto a frame 7. An optically scannable information carrier 9, such as a DVD, can be placed on the table 1, which information carrier is provided with a disc-shaped transparent substrate 11 and an information layer 13 on which a spiral-shaped information track is present. The optical player further comprises an optical scanning device 15 in accordance with the invention for optically scanning the information track of the information carrier 9. By means of a displacement device 17 of the optical player, the scanning device 15 can be displaced with respect to the axis of rotation 3 mainly in opposite radial directions X and X'. For this purpose, the scanning device 15 is secured to a slide 19 of the displacement device 17, which is further provided with a straight guide 21, over which the slide 19 is displaceably guided, which straight guide extends parallel to the X-direction and is provided on the frame 7, and with an electric motor 23 by means of which the slide 19 can be displaced over the guide 21. In operation, the motors 5 and 23 are driven by an electrical control unit, not shown in the drawing, of the optical player, in such a manner that the resulting rotation of the information carrier 9 about the axis of rotation 3 and, simultaneously, the displacement of the scanning device 15 in a direction parallel to the X-direction take place in such a manner that the spiral-shaped information track present on the information carrier 9 is scanned by the scanning device 15. During scanning, information present on the information track can be read by the scanning device 15, or information can be written by the scanning device 15 on the information track.

The optical scanning device 15 in accordance with the invention used in the optical player in accordance with the invention is diagrammatically shown in FIG. 2. The scanning device 15 is provided with a radiation source 25, such as a semiconductor laser with an optical axis 27. The scanning device 15 further comprises a radiation beam splitter 29 which comprises a transparent plate 31 having a reflecting surface 33 facing the radiation source 25, which transparent plate 31 is arranged at an angle of 45° with respect to the optical axis 27 of the radiation source 25. The scanning device 15 further includes a collimator lens unit 35 with a first optical axis 37 and an objective lens unit 39 with a second optical axis 41, the collimator lens unit 35 being arranged between the radiation beam splitter 29 and the objective lens unit 39. In the example shown, the collimator lens unit 35 comprises a single collimator lens 43, while the objective lens unit 39 comprises an objective lens 45 and an auxiliary lens 47 arranged between the objective lens 45 and the information carrier 9. In the example shown, the first optical axis 37 and the second optical axis 41 coincide and include an angle of 90° with the optical axis 27 of the radiation source 25. The scanning device 15 further includes an optical detector 49 of a type which is known per se and customarily used, which optical detector is arranged, with respect to the collimator lens unit 35, behind the radiation beam splitter 29. In operation, the radiation source 25 generates a radiation beam 51, which is reflected by the reflective surface 33 of the radiation beam splitter 29 and focused by the objective lens unit 39 to a scanning spot 53 on the information layer 13 of the information carrier 9. The radiation beam 51 is reflected by the information layer 13 so as to form a reflected radiation beam 55 which is focused, via the objective lens unit 39, the collimator lens unit 35 and the radiation beam splitter 29, onto the optical detector 49. To read information present on the information carrier 9, the radiation source 25 generates a continuous radiation beam 51, and the optical detector 49 supplies a detection signal which corresponds to a series of elementary information characteristics on the information track of the information carrier 9, which elementary information characteristics are successively present in the scanning spot 53. To write information on the information carrier 9, the radiation source 25 generates a radiation beam 51 which corresponds to the information to be written, a series of successive elementary information characteristics on the information track of the information carrier 9 being generated in the scanning spot 53. It is to be noted that the invention also comprises optical scanning devices wherein the radiation source 25, the collimator lens unit 35 and the objective lens unit 39 are arranged differently with respect to each other. For example, the invention comprises embodiments in which the first optical axis 37 and the second optical axis 41 mutually include an angle of 90°, and in which an additional mirror is arranged between the collimator lens unit 35 and the objective lens unit 39. In these embodiments, the dimensions of the optical scanning unit are reduced, viewed in a direction parallel to the second optical axis 41. The invention also includes, for example, embodiments wherein the radiation source 25 and the collimator lens unit 35 are not arranged on the slide 19 but in a fixed position with respect to the frame 7, and wherein the first optical axis 37 is directed parallel to the radial directions X, X'. In these embodiments, only the objective lens unit 39 and an additional mirror are arranged on the slide 19, so that the displaceable mass of the slide 19 is reduced.

As is further shown in FIG. 2, the optical scanning unit 15 comprises a first actuator 57 and a second actuator 59. By means of the first actuator 57, the objective lens unit 39 can be displaced over comparatively small distances, parallel to the second optical axis 41, and over comparatively small distances parallel to the X-direction. By displacing the objective lens unit 39 parallel to the second optical axis 41 by means of the first actuator 57, the scanning spot 53 is focused with a desired accuracy on the information layer 13 of the information carrier 9. By displacing the objective lens unit 39, by means of the first actuator 57, in a direction parallel to the X-direction, the scanning spot 53 is maintained, with the desired accuracy, on the information track to be followed. For this purpose, the first actuator 57 is controlled by said control unit of the optical player, which receives a focusing error signal as well as a tracking error signal from the optical detector 49. By means of the second actuator 59, the collimator lens 43 of the collimator lens unit 35 can be displaced, in a direction parallel to the first optical axis 37, from a first position to a second position, which is diagrammatically indicated in FIG. 2 by means of dashed lines A and B, respectively, and from said second position to said first position. The collimator lens 43 shown in FIG. 2 is positioned between the first position A and the second position B. As the collimator lens 43 can be placed in two positions A and B, the optical scanning device 15 can suitably be used, in a known and customary manner, for selectively scanning two types of information carriers having mutually different substrate thicknesses, or for selectively scanning both parallel information layers of two-layer information carriers. A displacement of the collimator lens 43 causes a convergence angle of the radiation beam 51 enclosed by the objective lens unit 39 and the substrate 11 to be adapted to the substrate thickness, such that the radiation beam 51 is focused to a minimum scanning spot 53 on the information layer 13 of the selected information carrier 9 or on the selected information layer of the two-layer information carrier.

FIGS. 3 and 4 show two different sectional views of the second actuator 59. The second actuator 59 comprises a first part 61, which is secured in a fixed position with respect to the slide 19, and a second part 63 which is secured to a holder 65 of the collimator lens 43. The second part 63 is coupled to the first part 61 by means of two parallel leaf springs 67 and 69, which each extend, in the slack state, in a plane extending transversely to a Y-direction extending parallel to the first optical axis 37. In this manner, the second part 63 is displaceably guided, with respect to the first part 61, by means of the two leaf springs 67, 69 in a direction parallel to the Y-direction. The leaf springs 67, 69 cause the second part 63 to be particularly rigidly guided with respect to the first part 61, whereby displacements of the second part 63 with respect to the first part 61 in directions perpendicular to the Y-direction and tilting of the second part 63 with respect to the first part 61 are substantially impossible.

As shown in FIGS. 3 and 4, the first part 61 of the second actuator 59 comprises a permanent magnet 71 and a first magnetizable part 73, which forms part of a magnetic circuit 75 of the second actuator 59. The second part 63 of the second actuator 59 comprises an electric coil 77 and a second magnetizable part 79 of the magnetic circuit 75. The first magnetizable part 73 of the magnetic circuit 75 is U-shaped and provided with two legs 81 and 83 which extend substantially perpendicularly to the Y-direction. The permanent magnet 71 is arranged between the two legs 81, 83 of the first magnetizable part 73 and has a direction of magnetization M, which is directed substantially parallel to the legs 81, 83. The second magnetizable part 79 of the magnetic circuit 75 is plate-shaped. The electric coil 77 is secured onto the second magnetizable part 79 and comprises wire portions 85 and 87 which extend substantially perpendicularly to the Y-direction and substantially perpendicularly to the direction of magnetization M of the permanent magnet 71. FIG. 3 diagrammatically shows a number of field lines 89, 91 of a magnetic field, which is generated near the ends of the legs 81, 83 by the permanent magnet 71 and the magnetic circuit 75. In the transition region between the ends of the legs 81, 83 and the permanent magnet 71, the field lines 89, 91 are arc-shaped and make a U-turn from the end portions of the two legs 81, 83 so as to be directed inwards, i.e. towards the permanent magnet 71. Said magnetic field exerts a magnetic force $F_M$ on the second magnetizable part 79, which magnetic force comprises a component $F_{M,Y}$ extending parallel to the Y-direction. FIG. 5 diagrammatically shows the connection between the size of the component $F_{M,Y}$ and the position of the second part 63 parallel to the Y-direction with respect to the first part 61. FIG. 5 also shows the above-mentioned first position A and second position B. Around the first position A, the leaf springs 67, 69 exert an elastic pretension $F_S$ on the second part 63 in the Y'-direction, which is contrary to the Y-direction. In the first position A, this pretension $F_S$ is in equilibrium with the component $F_{M,Y}$ of the magnetic force, which acts in the Y-direction. Around the second position B, the leaf springs 67, 69 exert an elastic pretension $F_S$ on the second part 63 in the Y-direction. In the second position B, this pretension $F_S$ is in equilibrium with the component $F_{M,Y}$ of the magnetic force, which acts in the Y'-direction. If the second part 63 is displaced from the first position A over a small distance in the Y'-direction under the influence of, for example, an external interfering force, then the increase of the component $F_{M,Y}$ is larger than the reduction of the pretension $F_S$ so that the second part 63 is driven back to the first position A. If the second part 63 is displaced from the first position A over a small distance in the Y-direction, then the reduction of the component $F_{M,Y}$ exceeds the increase of the pretension $F_S$, so that the second part 63 is also driven back to the first position A. If the second part 63 is displaced from the second position B over a small distance in the Y-direction under the influence of, for example, an external interfering force, then the increase of the component $F_{M,Y}$ is larger than the reduction of the pretension $F_S$, so that the second part 63 is driven back to the second position B. If the second part 63 is displaced from the second position B over a small distance in the Y'-direction, then the reduction of the component $F_{M,Y}$ is larger than the increase of the pretension $F_S$, so that the second part 63 is also driven back to the second position B. Thus, around the two positions A and B, a predetermined region is present wherein the second part 63 is always driven back to the positions A and B, respectively, as a result of the variation of the component $F_{M,Y}$ supplied by said magnetic field, and in a non-energized state of the coil 77. By virtue thereof, the component $F_{M,Y}$ provides stable equilibrium positions of the second part 63 with respect to the first part 61 in both positions A and B. As these equilibrium positions are attained in a non-energized state of the coil 77, maintaining these equilibrium positions does not require current through the coil 77, i.e. no electric energy. To displace the second part 63 from one of the positions A and B to the other position, only a short current through the coil 77 is necessary. As the wire portions 85, 87 of the coil are directed substantially perpendicularly to the Y-direction and perpendicularly to the direction of magnetization M, a current in these wire portions 85, 87 causes a Lorentz force with a comparatively large component in the Y-direction or the Y'-direction to be generated, under the influence of which a displacement of the second part 63 from one position to the other position is generated. As the pretension $F_S$ of the leaf springs 67, 69 in the positions A and B is directed to, respectively, the position B and the position A, said pretension $F_S$ is helpful in displacing the second part 63 from one position to the other position, so that the necessary current through the coil 77 is limited.

In the manner described hereinabove, the collimator lens 43 is displaced by means of the second actuator 59 over comparatively large distances parallel to the Y-direction from the first position A to the second position B, or conversely. The necessary current through the coil 77 is supplied by a current source, which is not shown in the Figures, which is controlled by the above-mentioned control unit of the optical player. In a particular embodiment of the optical player and the optical scanning device 15 in accordance with the invention, the second actuator 59 is also used to correct spherical aberrations of the radiation beam 51 in the transparent substrate 11 of the information carrier 9. Such spherical aberrations are caused mainly by fluctuations in the thickness of the substrate and can be corrected, in a known and customary manner, by means of comparatively small displacements of the collimator lens 43. For this purpose, in each of the two positions A and B, the second actuator 59 is controlled by means of an electric control current by said control unit of the optical player, which receives an error signal from a sensor, not shown in the Figures, by means of which, for example, the thickness of the transparent substrate 11 near the scanning spot 53 can be measured. The control unit is embodied so as to control the electric current in the coil 77 in such a manner that the collimator lens 43 can be positioned, near the two positions A and B, in a position wherein said spherical aberration is corrected in a predetermined manner which is known per se and customary. The actuator 43 thus fulfills a double function, resulting in an efficient composition of the optical scanning device 15.

By means of the optical player in accordance with the invention, as described hereinabove, during scanning the information layer 13 of the information carrier 9, information present on the information layer 13 can be read or information can be written on the information layer 13. It is to be noted that the invention also relates to optical players which can be used exclusively to read information present on an information layer of an information carrier.

It is further observed that the invention also includes embodiments wherein the second actuator 59 is differently composed. By way of illustration, the two stable equilibrium positions of the collimator lens unit can also be attained, for example, by means of an actuator the first part of which is provided with two permanent magnets, which, viewed in a direction parallel to the Y-direction, are arranged at some distance from each other, and the second part of which is provided with a magnetizable part and a coil for co-operating with the two magnets. Instead of an actuator with two stable equilibrium positions, use can also be made of an actuator with more than two stable equilibrium positions, so that the optical scanning device can suitably be used to scan information carriers having more than two different substrate thicknesses. For example, the first part of the actuator may be provided, for example, with two permanent magnets which are arranged between the three legs of an E-shaped magnetizable part, said three legs extending substantially perpendicularly to the optical axis of the collimator lens unit. In this case, the second part of the actuator is provided with an electric coil and a magnetizable part for co-operating with the two permanent magnets and the E-shaped magnetizable part. By virtue thereof, three stable equilibrium positions are obtained.

What is claimed is:

1. An optical scanning device for scanning an optically scannable information carrier, which scanning device is provided with a radiation source, a collimator lens unit with a first optical axis, an objective lens unit with a second optical axis, and an actuator for displacing the collimator lens unit, in a direction parallel to the first optical axis, from a first position to at least a second position, which actuator is provided with a first part and a second part, which are displaceably guided with respect to each other in a direction parallel to the first optical axis, characterized in that the first part of the actuator comprises a permanent magnet and a first magnetizable part of a magnetic circuit, while the second part of the actuator comprises an electric coil and a second magnetizable part of a magnetic circuit, both parts of the actuator mutually exerting a magnetic force in predetermined regions around the first position and around the second position, and in a non-energized state of the coil, which magnetic force causes both parts of the actuator to move with respect to each other into, respectively, the first and the second position.

2. An optical scanning device as claimed in claim 1, characterized in that the first magnetizable part of the magnetic circuit is U-shaped and provided with two legs, which extend substantially perpendicularly to the first optical axis, and the permanent magnet is arranged between the two legs and magnetized in a direction which is substantially parallel to said legs, while the electric coil is secured to the second magnetizable part of the magnetic circuit and provided with wire portions extending substantially perpendicularly to the first optical axis and substantially perpendicularly to the legs.

3. An optical scanning device as claimed in claim 1, characterized in that the first part and the second part of the actuator are displaceably guided, with respect to each other, in a direction parallel to the first optical axis by means of two leaf springs extending transversely to the first optical axis.

4. An optical scanning device as claimed in claim 3, characterized in that, in the first position and in the second position, the leaf springs exert an elastic pretension on both parts of the actuator, causing both parts of the actuator to move with respect to each other into, respectively, the second position and the first position.

5. An optical scanning device as claimed in claim 1, characterized in that the scanning device is provided with a control unit, which is embodied so as to control an electric control current in the coil in such a way, that the two parts of the actuator proximate to the first position and proximate to the second position can be positioned, with respect to each other, in a position wherein a spherical aberration of a radiation beam supplied by the radiation source in a transparent substrate of the information carrier can be corrected in a predetermined way.

6. An optical player comprising a table which can be rotated about an axis of rotation, an optical scanning device for scanning an optically scannable information carrier which can be placed on the table, and a displacement device by means of which at least an objective lens unit of the scanning unit can be displaced, in operation, with respect to the axis of rotation mainly in a radial direction, characterized in that the optical scanning device is an optical scanning device as claimed in claim 1.

* * * * *